United States Patent Office 2,785,200
Patented Mar. 12, 1957

2,785,200

DICHLOROBENZOYL-ETHYLENEDIAMINE

Marjorie B. Moore, Waukegan, Ill., assignor to Abbott Laboratories, North Chicago, Ill., a corporation of Illinois No Drawing. Application June 8, 1953,
Serial No. 360,386

4 Claims. (Cl. 260—558)

This invention relates to a new class of halogen-substituted benzamides and more particularly to benzamides having an alkamine group attached to the nitrogen thereof.

The new compounds of this invention are useful in restoring normal rhythm to the fibrillating heart. The compounds are characterized by the formula

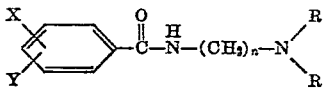

in which X and Y are halogen, $n$ is a small whole number and R is lower alkyl.

The bases represented by the foregoing formula are ordinarily used in the form of the non-toxic addition salts thereof. For example the hydrochloride, the sulfate, the citrate and the tartrate may be mentioned. The quaternary ammonium salts may also be employed and are made in the customary manner by reaction with an alkyl halide.

The R substituent may be methyl, ethyl, propyl, butyl and the corresponding branched chain radicals. The alkylene chain designated by—$(CH_2)_n$— may vary from 1 to 6 carbons in length and also includes branched chained groups of a similar size.

The following examples are presented in order to describe the invention more clearly. It should be understood however that the examples are not intended to limit the invention in any way.

EXAMPLE I

N-(β-diethylaminoethyl)-2,4-dichlorobenzamide hydrochloride

About 150 ml. dry benzene containing 52.4 g. (0.25 mole) of 2,4-dichlorobenzoyl chloride is stirred and cooled to 10° C. Then 29 g. (0.25 mole) N,N-diethylethylenediamine in 50 ml. dry benzene is dropped in with continued cooling and stirring at such a rate as to keep the temperature of the reaction mixture below 15° C. Stirring and cooling are continued for an hour and the product allowed to stand for another hour at room temperature to allow the frozen solvent to melt. The crystalline precipitate is filtered and sucked as dry as possible. The product is recrystallized from isopropanol and when dried melts at 131–133° C. This is the hydrochloride of N-(β-diethylaminoethyl)-2,4-dichlorobenzamide.

EXAMPLE II

N-(β-diethylaminoethyl)-3,4-dichlorobenzamide hydrochloride

The procedure in Example I is repeated substituting 0.25 mole of 3,4-dichlorobenzoyl chloride for the 2,4-dichlorobenzoyl chloride of Example I. The product N-(β - diethylaminoethyl) 3,4 - dichlorobenzamide hydrochloride is obtained and melts at 125° C.–126° C.

EXAMPLE III

N-(β-diethylaminoethyl)-3,5-dichlorobenzamide hydrochloride

The process of Example I is repeated substituting 0.25 mole of 3,5-dichlorobenzoyl chloride. The product N-(β-diethylaminoethyl)-3,5-dichlorobenzamide hydrochloride is recrystallized from isopropanol.

Others may practice the invention in any of the numerous ways which will be suggested to one skilled in the art. It is intended that such practice of the invention is to be included hereunder provided it falls within the scope of the appended claims.

I claim:

1. A compound selected from the group consisting of base having the formula

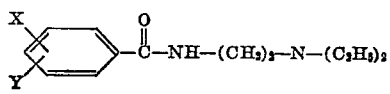

wherein X and Y are chlorine, and the non-toxic acid salts thereof.

2. N-(β-diethylaminoethyl)-2,4-dichlorobenzamide hydrochloride.

3. N-(β-diethylaminoethyl)-3,4-dichlorobenzamide hydrochloride.

4. N-(β-diethylaminoethyl)-3,5-dichlorobenzamide hydrochloride.

References Cited in the file of this patent

UNITED STATES PATENTS

| | | |
|---|---|---|
| 2,410,431 | Donleavy | Nov. 5, 1946 |
| 2,670,373 | Cusic | Feb. 23, 1954 |
| 2,698,327 | Cusic | Dec. 28, 1954 |

FOREIGN PATENTS

| | | |
|---|---|---|
| 219,304 | Great Britain | Aug. 20, 1925 |

OTHER REFERENCES

Cook et al.: "Rec. Trav Chim.," vol. 69 (1950), pp. 343–350.

Einhorn: "Liebigs Annalen," vol. 343 (1905) p. 232.